United States Patent [19]

Leowald et al.

[11] Patent Number: 5,384,528

[45] Date of Patent: Jan. 24, 1995

[54] METHOD AND APPARATUS FOR RECOGNIZING DEFECTS IN A TRIGGERING SYSTEM OF A CONTROLLED SERIES COMPENSATOR

[75] Inventors: Karl-Friedrich Leowald, Uttenreuth-Weiher; Stephan Weiss, Bad Mergentheim, both of Germany

[73] Assignee: Siemens Aktiengessellschaft, Munich, Germany

[21] Appl. No.: 63,385

[22] Filed: May 18, 1993

[30] Foreign Application Priority Data

May 20, 1992 [EP] European Pat. Off. ......... 92108542.9

[51] Int. Cl.$^6$ ............................ G05F 1/70; G05F 1/44
[52] U.S. Cl. ..................................... 323/209; 363/54; 361/92
[58] Field of Search ............... 323/209, 210, 211; 363/54, 85; 361/92

[56] References Cited

U.S. PATENT DOCUMENTS 4,999,565 3/1991 Nilsson ................. 323/210

FOREIGN PATENT DOCUMENTS

WO8704538 7/1987 WIPO.

OTHER PUBLICATIONS

IEEE Transactions on Power Delivery, vol. 4, No. 1 Jan. 1989, New York, US, pp. 241–247, N. Sadanandan et al.: *Miccroprocessor–based Capacitor Bank Ccontrol and Protection System*.
Ekektrie, vol. 34, No. 3, Mar. 1991, Berlin, DE, pp. 88–90, G. Thumm et al.: Geregelte Parallel-und Reihenkompensation.
IEE Meeting, 1991, London, UK, N. Christl et al.: *Power System Studies and Modelling for the Kayenta 230 KV Substation Advanced Series Compensation*, pp. 33–37.
Cigre Tagung, Summer 1992, N. Christl et al.: *Advanced Series Compensation (ASC) with Thyristor Controlled Impedance*, pp. 1–10.
EPRI Workshop, Nov. 14–16, 1990, Cincinnati, Ohio, Siemens, Munich, Germany: *Advanced Series Compensation with Variable Impedance*, 13 pages.

Primary Examiner—Emanuel T. Voeltz
Attorney, Agent, or Firm—Kenyon & Kenyon

[57] ABSTRACT

A method and a device for recognizing defects in a triggering system of a controlled series compensator. An intervention is made in the closed-loop control of the controlled series compensator on the basis of an impedance differential ($\Delta Z$) determined from a setpoint impedance ($Z_{S1}$, $Z_{S2}$) and from an effective impedance ($Z_i$) calculated from system variables ($i_L, u_C$), and in dependence upon the voltage level of a measured conduction current ($i_L$). When the conduction currents ($i_L$) are smaller than a limiting value ($i_{LG}$), the firing is blocked in the branches, and when the conduction currents ($i_L$) are greater than a limiting value ($i_{LG}$), a firing-angle signal ($S_{\alpha S}$) is generated, through which means the valve (Th1, Th2) can be protectively fired. Thus, one is able to recognize defects in the triggering system of the controlled series compensator by applying system variables ($i_L, u_C$), and this series compensator is able to be brought into such a state that disadvantages are avoided for the network operation, through which means the availability of the system and the quality of the compensation are increased.

11 Claims, 3 Drawing Sheets

METHOD AND APPARATUS FOR RECOGNIZING DEFECTS IN A TRIGGERING SYSTEM OF A CONTROLLED SERIES COMPENSATOR

BACKGROUND OF THE INVENTION

The present invention relates to a method and a device for recognizing defects in a triggering system of a controlled series compensator.

In series compensation systems, capacitors are usually employed in the wiring run to reduce the current-dependent voltage drop across the line and the transmission angle, in steps. These capacitors are capacitor banks, which are switched on and off in series, as a whole or in several capacitor sections (segments). The capacitor is switched on and off by opening or closing a parallel circuit-breaker. In case of a short-circuit on the network, a parallel arrester, a triggerable spark gap, and/or a parallel circuit-breaker guarantee protection for the capacitor.

Furthermore, a series compensation system is known, in which by means of an inductor connected in parallel with the capacitor, the total impedance of this series capacitor, similarly to the case of a TCR (thyristor controlled reactor) in the static compensator, is steplessly controlled with a current-converter valve to high-voltage potential through appropriate triggering. A series compensator controlled in this manner is known as an ASC (Advanced Series Compensation). A series compensator controlled in this manner allows the dynamic response of the series compensation to be improved, and the total impedance is able to be controlled automatically within a certain range, whereby the impedance can be changed from capacitive to inductive impedance.

These types of series capacitors are introduced in the essay, Automatically Controlled Parallel- and Series Compensation [*Geregelte Parallel- und Reihenkompensation*], published in the German periodical, "Elektrie", Volume 45, 1991, March pp. 88 through 90. In addition, the International Patent WO 87/04538 describes a series capacitor, which is controlled in such a manner and is integrated in a transmission line.

The impedance of the series compensator is adjusted by influencing the firing angle of the current-converter valve, which is electrically connected in parallel via a coil to the series capacitor of the series compensator. The current-converter valve consists of two antiparallel connected valves, which are each comprised of several series-connected valves. The impedance to be adjusted is predetermined by primary coordinating (conduction current control, load voltage control, oscillation damping). In an arrangement of the series compensator in a three-phase voltage system, the impedance to be adjusted is of the same magnitude in the three phases. The firing angle $\alpha$, which applies to the alternating component of the capacitor voltage, has a non-linear relation to the impedance.

When there are defects in the triggering system of the valves, it can be that the impedance of the controlled series compensator does not equal the setpoint impedance required by a closed-loop control or by an open-loop control. This state of the controlled series compensator results in disadvantages for the network (asymmetry, unequal loading of the lines, different degree of compensation). It can happen that the advantages of the controlled series compensator are lost, or that these advantages turn into disadvantages.

Therefore, this fault condition in the controlled series compensator must be able to be detected by the series compensator itself, since this fault condition can only be detected with the existing devices in the network after a delay, or it cannot be detected at all. Thus, the controlled series compensator requires a self-monitoring system.

Defects in the triggering system often result in a changed firing performance for the current-converter valve, i.e., the current-converter valve is brought into circuit after a delay or is not brought into circuit at all. Of the possible defects, one special case would be the failure of the valve electronics at a single valve location. The valve can only be brought into circuit by operating the overvoltage damping diode, also known as a break-over diode (BOD), which serves as overvoltage protection. The operating response voltage of an overvoltage damping diode is only slightly less than the maximum positive blocking voltage of the corresponding valve. In dependence upon the level of the capacitor voltage of the series capacitor of the controlled series compensator and upon the firing angle, the operating voltage of the overvoltage damping diode is reached and the valve is brought into circuit with delay. If the operating voltage of the overvoltage damping diode is not reached at other system working points, the result is a firing failure, which means that the controlled series compensator only still has a restricted control range at its disposal.

Apart from the mentioned case, all defects in the triggering system result in a failure of the valve firing.

Faults in the closed-loop control system and in the triggering system must be detected by devices of the controlled series compensator and, in this respect, this series compensator must be brought into a state in which disadvantages for the network operation are avoided.

SUMMARY OF THE INVENTION

The present invention relates to a method and an apparatus which allow defects in a triggering system of a controlled series compensator to be recognized and the controlled series compensator to be brought, in this respect, into such a state that disadvantages will be avoided for the network operation.

Defects in the triggering system of a controlled series compensator occur randomly, i.e., independently of the operating mode—steady-state operation, TCR operation (thyristor controlled reactor), TSR operation (thyristor switched reactor). To detect such defects in the triggering system of the controlled series compensator, comparing the impedance of the series compensator would provide a solution. When the controlled series compensator is functioning properly, it can be assumed that in the steady-state operation, the currently active impedance conforms with a specified setpoint impedance. The currently active impedance can be calculated from available measured values (conduction current, capacitor voltage). The differential value for impedance that is formulated can either be observed for an appropriate time span and/or be compared to a limiting value. If the differential impedance value is present beyond this time span and/or exceeds the limiting value, then an intervention must be made into the triggering system, since a defect exists.

The type of intervention is dependent upon the voltage level of the measured conduction current. If the conduction current is smaller than a limiting value, the firing is blocked in all branches, since the voltage across the series capacitor would never attain the operating voltage of the overvoltage protection because of such a small conduction current. If the conduction current is greater than a limiting value, then the firing angle is limited in all branches to a value that is dependent upon the voltage level of the measured conduction current, so that the valve can be brought into the circuit by means of protective firing. If the valve is brought into the circuit by means of protective firing, this is signalled to the valve-base electronics of the triggering system. In this case, a stable TCR operation having a restricted control range is possible. If in spite of sufficient conduction current, the valve is not brought into the circuit, i.e., neither the protective firing is signalled nor is the impedance differential reduced, then the firing is blocked in all branches.

By evaluating network variables and comparing them to reference variables, the method and apparatus according to the present invention intervenes to control the manipulated variable (impedance or firing angle) of the controlled series compensator. Besides detecting valve malfunctions by evaluating network variables and manipulated variables, this method also detects instances of asymmetrical triggering of a controlled series compensation system in a three-phase network. This method increases the availability of the system, as well as the quality of the compensation through symmetrical operation.

Other possible ways for monitoring the valve firing, for example comparing the firing pulse to the subsequent current flow in the valve or evaluating the check-back signal from a protective firing that has taken place, do not furnish any information or only provide uncertain information depending upon the system working point of the controlled series compensator.

According to another method, a firing-angle signal is generated, as soon as the measured capacitor voltage exhibits a direct voltage component, and the value of the measured valve current of the controlled series compensator is less than or equal to a lower limiting value, whereby the value of the firing signal is dependent upon the level of the conduction current to such an extent that a protective firing can take place. The failure of a valve leads in the series capacitor of the controlled series compensator to a direct voltage component, which can be recognized in the measured capacitor voltage. Moreover, in case of a failure of the current-converter valve, the valve current falls below a low limiting value or equals zero. Consequently, this method is used to detect valve failures, which are not able to be recognized by means of valve electronics. In this case as well, network variables are evaluated and compared to reference variables, i.e., faults in the closed-loop control and in the triggering system are detected by devices of the controlled series compensator and, as a result, this series compensator is brought into such a state, that disadvantages for the network operation are avoided.

One particularly advantageous embodiment of the apparatus for implementing the method for recognizing defects in a triggering system of a controlled series compensator according to the present invention provides for the device to be a microcomputer. Since it is preferable for the forward controlling elements and the controlling system of a controlled series compensator to be a computer system, the apparatus includes a program which recognizes defects in a triggering system.

To further clarify the method and the apparatus according to the present invention in which defects are recognized in a triggering system of a controlled series compensator, reference is made to the drawings, in which exemplified embodiments of an apparatus according to the present invention are schematically illustrated.

DETAILED DESCRIPTION

Figure 1:
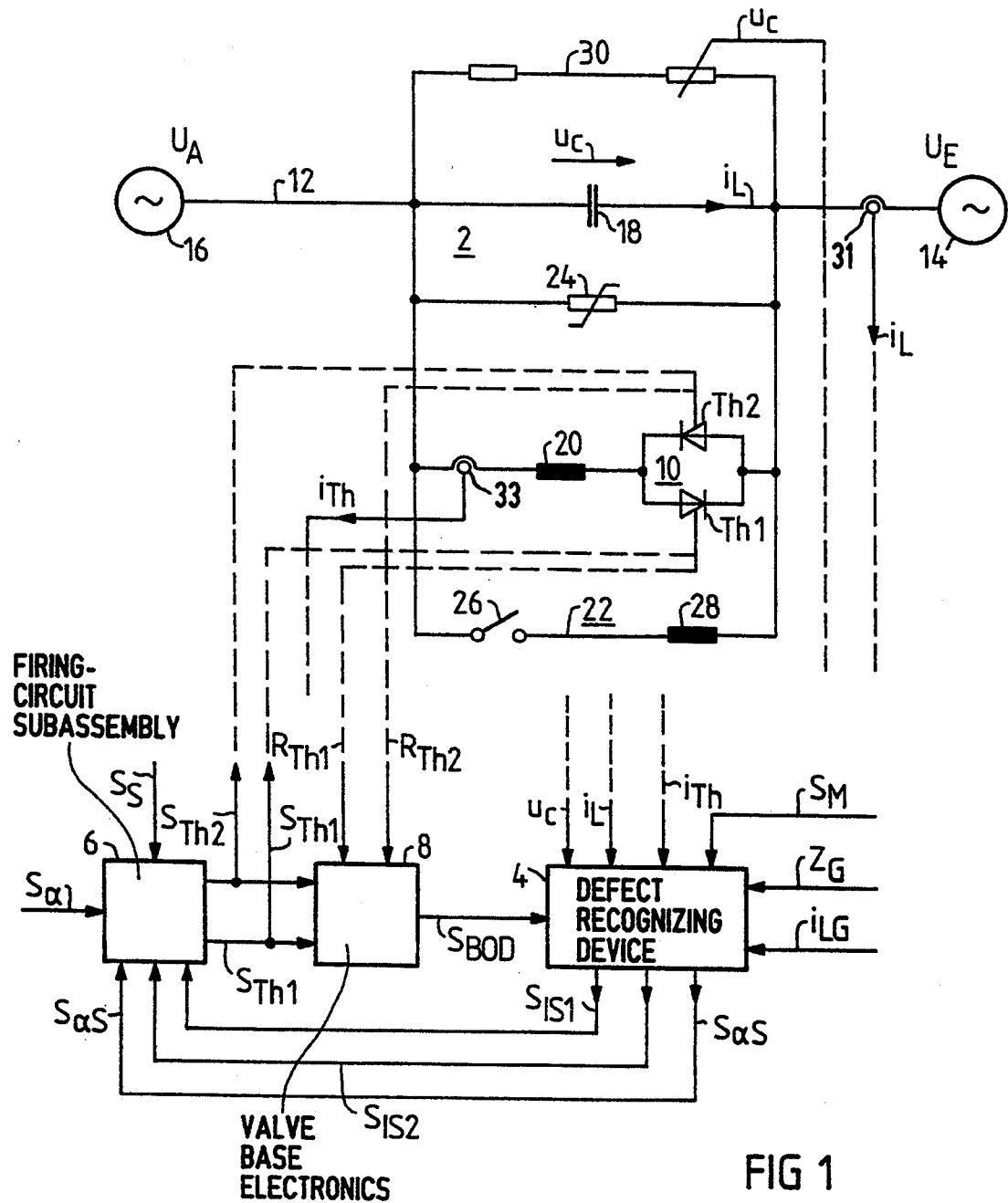
FIG. 1 illustrates a controlled series compensator and an apparatus for recognizing defects in its triggering system according to an embodiment of the present invention.

FIG. 1 depicts an equivalent circuit diagram of a controlled series compensator 2 having a device 4 for recognizing defects in a triggering system of the controlled series compensator 2. Only one firing-circuit subassembly 6 and one valve-base electronics circuit 8 from this triggering system are illustrated in FIG. 1. The firing-circuit subassembly 6, which assures a time-synchronous triggering of a current-converter valve 10 of the controlled series compensator 2, is connected on the output side to the valve-base electronics 8, which is electroconductively connected on the output side to the device 4. This firing-circuit subassembly 6 transmits firing signals $S_{Th1}$ and $S_{Th2}$ for the valves Th1 and Th2 of the current-converter valve 10, which are produced from a synchronizing signal $S_S$ and a firing-angle signal $S_\alpha$, which corresponds to a desired firing angle $\alpha$. The controlled series compensator 2, which is also known as ASC (Advanced Series Compensation), is brought into the circuit as a series resistor in a transmission line 12. In most cases, this occurs along line 12, but also takes place at the output or input of switching substations. Voltage sources 14 and 16 are indicated at the beginning and the end of the transmission line 12, respectively. The voltages $U_E$ and $U_A$ of voltage sources 14 and 16, respectively, differ in amplitude by a line-voltage drop $\Delta U$ and are phase-displaced in a voltage angle of rotation (or phase angle). The voltage $U_A$ across the beginning of the line is also described as a transmitting voltage $U_A$, and the voltage $U_E$ across the end of the line is also described as a load voltage $U_E$.

The structure of a controlled series compensation system 2 can be subdivided into three regions. The core of such a system 2 consists of a series capacitor 18, which is integrated serially in the transmission line 12. In this manner, the inductive series impedance of the line 12, which is responsible for the inductive reactive-power component, is compensated for. In the case of a controlled series compensation system 2, a branch consisting of a reactor 20 and a converter valve 10 is additionally connected in parallel. A parallel connection of two thyristor valves Th1 and Th2, which are arranged antiparallel to one another, is depicted as the converter valve 10. By means of these two thyristor valves Th1 and Th2, the reactor 20 can be brought into circuit at preset times for the positive and negative half-wave of the voltage $u_C$ of capacitor 18. In place of the thyristor valves Th1 and Th2, other semiconductor valves can also be used, such as GTO-thyristors (gate-turn-off thyristors). The structure of a thyristor valve for reactive-current compensation is published in the essay Power Converters for Static Reactive-Current Compensation [*Stromrichter fur statische Blindstromkotnpensation*] in the German periodical "Siemens-Energietechnik", volume 3 (1981), issue 11 and 12, pp. 353–357.

By means of the branch, it is possible for the effective impedance of the controlled series compensator 2 to be continually changed, capacitively and inductively, through a phase-angle control. In this manner, besides increasing transmission power, one is also able to limit a short-circuit current on line 12, in case of a fault. The advantages enumerated in the textbook, Series Capacitors in Electric Networks [*Reihenkondensatoren in elektrischen Netzen*] by Dr.-Eng. Leonhard Mailer, 1967, page 4, associated with the application of series capacitors also apply to a controlled series compensator 2.

To protect the series capacitor 18, the reactor 20 and the converter valve 10 from overloads caused by high conduction currents $i_L$, a by-pass path 22 and a non-linear resistor 24 (also known as an arrester) are installed in parallel with capacitor 18 and the series combination of reactor 20 and converter valve 10. A metal-oxide varistor (MOV) may be provided, for example, as the non-linear resistor 24. This metal-oxide varistor (24), which is connected electrically parallel to the series capacitor 18, is dimensionally designed to allow arrester 24 to take over the current conduction very quickly at a predetermined voltage amplitude. Consequently, it protects the series capacitor 18 from longer lasting overload conditions. The energy absorption capacity of a non-linear resistor 24 is naturally limited due to economic considerations. Therefore, a series compensation system 2 must also be capable of protecting the series capacitor 18 with its arrester 24 from overloads. This task is assumed by the parallel by-pass path 22. This by-pass path 22 consists of a by-pass switch 26 and a damping circuit 28. In place of the by-pass switch 26, a triggerable spark gap or a combination of the two can be provided. The by-pass switch 26 is closed as soon as the loading, i.e., the energy absorption capacity of the arrester 24, is exhausted.

A potential divider 30 at whose output the capacitor voltage $u_c$ is applied is similarly provided electrically parallel to the series capacitor 18.

The actual value of the conduction current $i_L$ is measured in the transmission line 12 by means of a device 31, while on the other hand the actual value of the current $i_{Th}$ flowing through the coil 20 and the current-converter valve 10 is measured by means of a device 33. These system variables $i_L$ and $u_C$ and $i_{Th}$ are carried over a fiber-optic system in a manner that is potential-free from the system 2, which is at high voltage potential, to the device 4 to recognize defects in a triggering system of this system 2, which is at earth potential. This potential-free transmission of the system variables $i_L$, $u_C$ and $i_{Th}$ is depicted by a broken line.

Also supplied to the defect recognizing device 4 for recognizing defects are a mode signal $S_M$, an impedance limiting value $Z_G$, and a conduction-current limiting value $i_{LG}$. The outputs of the device 4 are connected to the firing-circuit subassembly 6.

Figure 2:
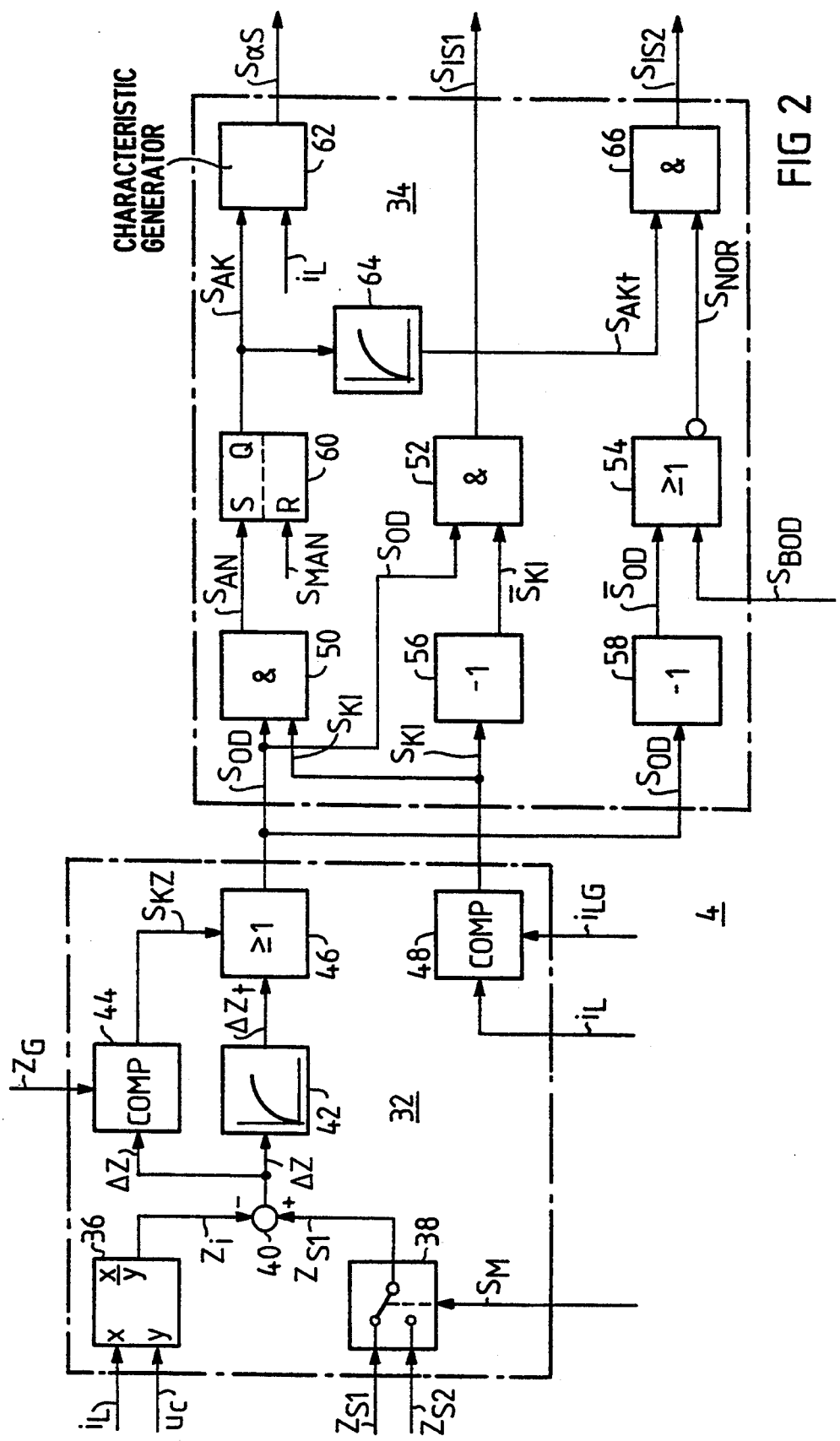
FIG. 2 more closely depicts as a block diagram the structure of the apparatus for recognizing defects according to the embodiment of the present invention illustrated in FIG. 1.

FIG. 2 depicts a block diagram of the defect recognizing device 4 according to FIG. 1. Defect recognizing device 4 consists on the input side of a signal-conditioning device 32 and, on the output side, of a signal processing device 34, which is connected to outputs of the signal-conditioning device 32. In one advantageous specific embodiment of the defect recognizing device 4, a microcomputer is provided as the device 4.

On the input side, the signal-conditioning device 32 has a processor circuit 36 for calculating the effective, current impedance $Z_i$ from the measured capacitor voltage $u_C$ and the measured conduction current $i_L$. A changeover switch 38 is also provided on the input side of signal-conditioning device 32, at whose inputs the setpoint impedances $Z_{S1}$ and $Z_{S2}$ are applied, and at whose control input the mode signal $S_M$ is applied. The outputs of the processor circuit 36 and of the changeover switch 38 are linked via a comparator 40 to an observation stage 42 and/or to a first comparator 44. The output of the processor circuit 36 is thereby electroconductively connected to the negative input of the comparator 40, and the output of the changeover switch 38 is connected to the positive input of the comparator 40. An impedance limiting value $Z_G$ is applied to a second input of the first comparator 44. On the output side, comparator 44 is connected to a first input of an OR-gate 46. The second input of OR-gate 46 is linked to the output of the observation stage 42, which can be a proportional-action controller of the first order ($PT_1$-controller), for example.

Moreover, on the input side, the signal-conditioning device 32 includes a second comparator 48 having a first input at which the measured conduction current $i_L$ is applied and a second input at which a conduction-current limiting value $i_{LG}$ is applied. The output of the OR-gate 46 and the output of the second comparator 48 constitute the outputs of the signal-conditioning device 32.

On the input side, the signal-conditioning device 34 has a first AND gate 50 and a second AND gate 52, and a NOR gate 54. The first input of the first AND gate 50 is electroconductively connected to the first input of the second AND gate 52. The second input of the first AND gate 50 is linked by means of an inverter 56 to the second input of the second AND gate 52. Moreover, the first input of the first AND gate 50 is connected via a further inverter 58 to a first input of the NOR gate 54. The second input of this NOR gate 54 is electroconductively connected to the output of the valve-base electronics 8 according to FIG. 1. The output of the first AND gate 50 is connected to the set input S of an RS flip-flop 60, whose output Q is linked to a first input of a function generator 62. The measured conduction current $i_L$ is applied at the second input of the function generator 62. A manual signal $S_{MAN}$ is applied to the reset input R of RS flip-flop 60. The output Q of the RS flip-flop 60 is connected via an observation stage 64 to a third AND gate 66. The second input of the third AND gate 66 is connected to the output of the NOR gate 54. As an observation stage 64, a proportional-action controller of the first order ($PT_1$- controller) can likewise be provided whose time delay is able to be adjusted to a specifiable observation time. The outputs of the characteristic generator 62 and of the second and third AND gates 52 and 66 constitute the outputs of the signal-processing device 34. A signal processor can be used in each case as a signal-conditioning device 32 and as a signal-processing device 34, or a microcomputer can be provided for both of them together. The signal-processing device 34 can also be made up of other logic modules.

On the basis of this block diagram of the defect recognizing device 4 for recognizing defects in a triggering system of a controlled series compensator 4, the method of operation of this device 4 will now be clarified in greater detail in the following.

As already mentioned at the outset, a proper functioning of the controlled series compensator 2 can be assumed when its impedance $Z_i$ measured in steady-state operation conforms with a specified setpoint impedance $Z_{S1}$ or $Z_{S2}$. The currently effective impedance $Z_i$ is calculated from the measured capacitor voltage $u_c$ and the measured conduction current $i_L$ of the controlled series compensator 2 by means of the processor 36. In dependence upon the mode signal $S_M$, the changeover switch 38 relays the input setpoint impedance $Z_{S1}$ or $Z_{S2}$ to its output.

In addition to the idle state as an operating mode of the controlled series compensator 2, there are also the running operating modes: TCR operation (thyristor controlled reactor) and TSR operation (thyristor switched reactor). The current-converter valve 10 is periodically fired in TCR operation, whereby the firing angle $\alpha$ is variable. In TSR operation, the current-converter valve 10 is continuously fired. In TSR operation, the setpoint impedance $Z_{S2}$ is fixed and corresponds to the impedance of the parallel connection of the series capacitor 18 and of the coil 20 of the controlled series compensator 2, which is significantly less than the impedance of the series capacitor 18. In TCR operation, impedance differentials $\Delta Z = Z_{S1} - Z_i$ occur in the non-steady-state condition, even given a fault-free triggering system. This is why the impedance differential $\Delta Z$, which is determined by means of the comparator 40, must be observed for an appropriate time span, before a more far-reaching intervention can be derived from it. A $PT_1$- controller can be provided as an observation stage 42, whose time delay is adjusted to the appropriate time span. If an impedance differential $\Delta Z$ is present longer than the appropriate time span, then a signal $\Delta Z_t$, which corresponds to the impedance differential $\Delta Z$, appears at the output of the observation stage 42. At the same time, the impedance differential $\Delta Z$ can be compared by means of the comparator 44 to an adjustable impedance limiting value $Z_G$. An output signal $S_{KZ}$ is applied to the output of the comparator 44.

If the impedance differential $\Delta Z$ has exceeded the impedance limiting value $Z_G$, or if this impedance differential $\Delta Z$ is present for the appropriate time span, so that this is no longer acceptable for the network, the output signal $S_{OD}$ at the output of the OR gate 46 changes from a low level to a high level. This means that an intervention must now be made. The type of intervention is dependent upon the level of the conduction current $i_L$. Comparator 48 determines whether the conduction current $i_L$ is greater or less than an adjustable conduction-current limiting value $i_{LG}$. A comparator signal $S_{KI}$ which exhibits a high level is applied to the output of the comparator 48 when $i_L > i_{LG}$. Comparator signal $S_{KI}$ exhibits a low level when $i_L < i_{LG}$. Signals $S_{OD\ and\ SKI}$ from the signal-conditioning device 32 are fed to the signal-processing device 34 as input signals. Additionally, signal-processing device 34 is supplied with input signals including the measured conduction current $i_L$ from device 31 and a protective-firing signal $S_{BOD}$ from the valve-base electronics 8.

TCR Operation

If the level of the conduction current $i_L$ is less than the limiting value $i_{LG}$ when a defect is detected in the triggering system of the controlled series compensator 2, then the level of comparator signal $S_{KI}$ is low, the output signal $S_{AN}$ from the first AND gate 50 is low and the level of the output signal $S_{JS1}$, also called the first firing-pulse blocking signal, from the second AND gate 52 is high, through which means the firing is blocked in all branches.

if the level of the conduction current $i_L$ is greater than the limiting value $i_{LG}$ when a defect occurs in the triggering system, then the comparator signal $S_{KI}$ is high and output signal $S_{AN}$ from the first AND gate 50 goes to a high level. This causes the output signal $S_{AK}$ from the RS flip-flop 60 likewise to jump to a high level. By this means, a firing-angle signal $S_{\alpha S}$ is determined in the function generator 62 in dependence upon the measured conduction current $i_L$ in such a way that, as a result of the large conduction current $i_L$, the valve voltage of the current-converter valve 10 runs up to the operating response voltage of the protective-firing device. If the current-converter valve 10 is fired by means of protective firing, then this is signalled by the check-back signals $R_{TH1}$ and $R_{TH2}$ to the valve-base electronics 8, which then feeds a protective-firing signal $S_{BOD}$ to the device 4. In this fault case (i.e., fault in one thyristor location), the current-converter valve 10 is periodically fired via the overvoltage diode (BOD), so that a stable TCR operation having a limited control range is possible. In this fault case, the firing angle $\Delta$ is smaller than 180°, and the impedance $Z_i$ of the controlled series compensator 2 is greater than the impedance $Z_C$ of the series capacitor 18, whereby for the impedance $Z_i$ of the controlled series compensator 2: $Z_C < Z_i < Z_1$. The impedance $Z_1$ is always distinctly greater than the impedance $Z_C$ of the series capacitor 18. However, it is not a fixed value, but rather is dependent both upon the firing angle $\alpha$ and the conduction current $i_L$ as well as upon the operating mode that is adjusted when the fault occurs (TCR operation with $\Delta < 180°$ or rather idle state $\Delta = 180°$). The impedance $Z_i$ between the capacitor impedance $Z_C$ and the impedance $Z_1$ is not adjustable, so that the result is an unsteady dynamic characteristic. Since periodic protective firing is detected and signalled in the valve-base electronics 8, this fault case is clearly identified.

If in spite of ample conduction current $i_L$, the current-converter valve 10 is not brought into circuit, i.e., there is neither a protective-firing signal $S_{BOD}$ nor a reduction in the impedance differential $\Delta Z$ (output signal $S_{OD}$ would have to change from high level to low level). As a result, the output signal $S_{NOR}$ from the NOR gate 54 changes from low level to high level, and the output signal $S_{JS2}$, also called the second firing-pulse blocking signal, from the third AND gate 66 changes from low signal to high level, since the output signal $S_{AK}$ from the RS flip-flop 60 was at a high level for an appropriate time span. The firing is blocked in all branches by means of this second firing-pulse blocking signal $S_{JS2}$.

TSR Operation:

In the TSR operation, the setpoint impedance $Z_{S2}$ of the controlled series capacitor 2 is constant and corresponds to the impedance $Z_L$ of the coil 20 of the series capacitor 2. The amount of this coil impedance $Z_L$ is always considerably smaller than that of the capacitor impedance $Z_C$. If the impedance differential $\Delta Z$ has been detected with certainty, i.e., the output signal $S_{OD}$ from the OR gate 46 has changed from low level to high level, then the firing can be blocked in all branches, while taking into consideration the impedance symmetry of the system 2 given conduction currents of $i_L < i_{LG}$ (first firing-pulse blocking signal $S_{IS2}$ changes from low level to high level). If the conduction current is $i_L > i_{LG}$, then a firing-angle signal $S_{\alpha S}$ is generated by means of the output signals $S_{AN}$ and $S_{AK}$ in a way that allows the valve voltage of the current-converter valve 10 to run up to the operating voltage of the overvoltage diode. If the current-converter valve 10 is brought into circuit at this point by way of the protective firing, then this is detected by the valve-base electronics 8 and communicated to the defect recognizing device 4 by means of the protective-firing signal $S_{BOD}$, which changes from low level to high level. If in spite of ample conduction current $i_L$, a periodic protective firing does not occur, then the protective-firing signal $S_{BOD}$ remains at a low level, through which means the second firing-pulse blocking signal $S_{IS2}$ changes from low level to high level by means of the output signals $S_{NOR}$ and $S_{AKb}$ so that the firing is blocked in all branches of the system 2.

Figure 3:
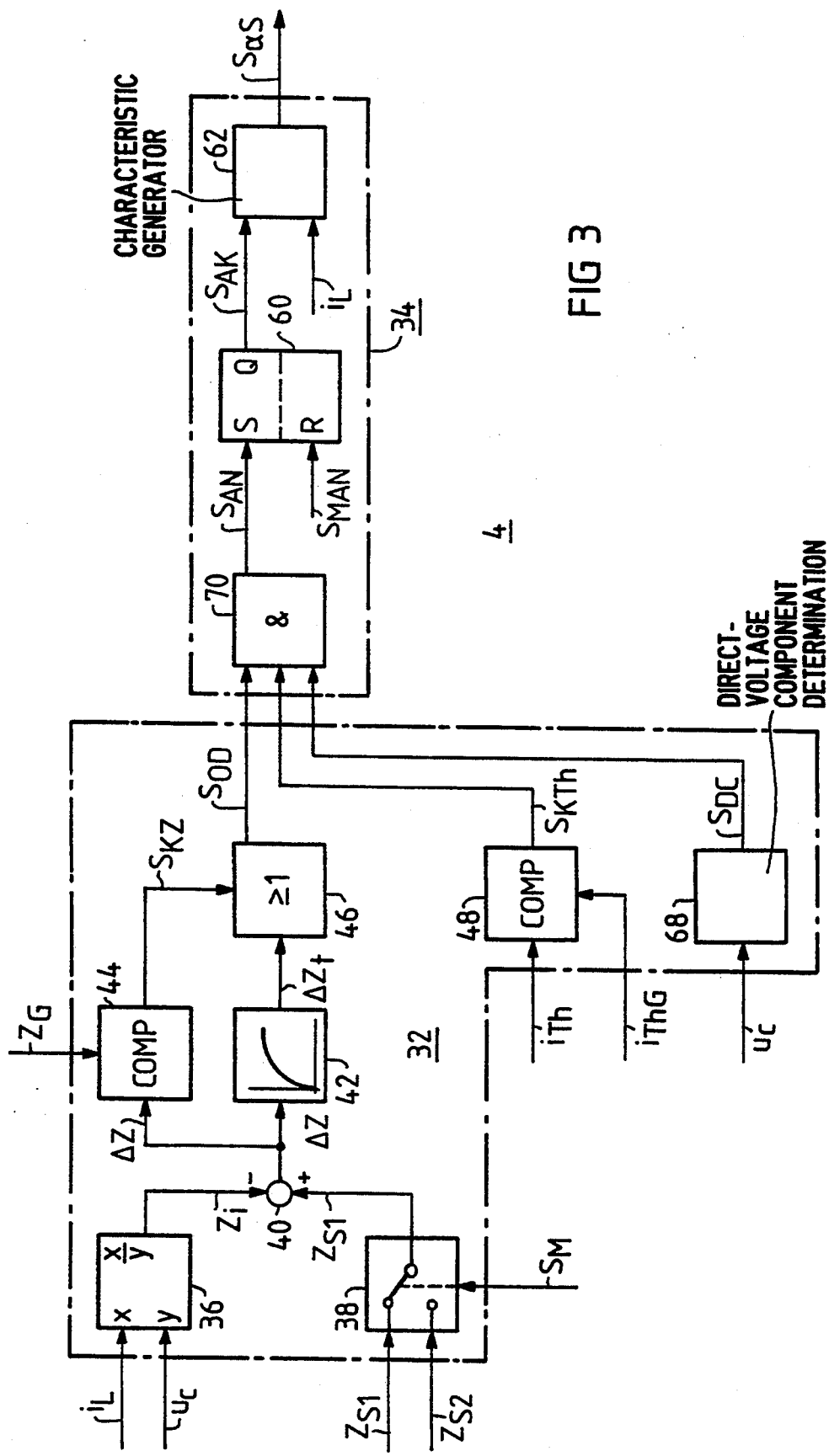
FIG. 3 illustrates in greater detail a block diagram of an advantageous specific embodiment of the apparatus according to FIG. 1.

Another block diagram of the defect recognizing device 4 is depicted in FIG. 3 in greater detail. Compared to the block diagram of the device 4 according to FIG. 2, the defect recognizing device 4 in FIG. 3 differs, on the one hand, in that the signal-conditioning device 32 includes a device 68 for determining d direct-voltage component of the capacitor voltage $u_C$ of the system 2. Defect recognizing device 4 of FIG. 3 additionally differs from device 4 of FIG. 2 in that the comparator 48 now compares the valve current $i_{Th}$ to a limiting value $i_{ThG}$, which is very small or equals zero. The signal-processing device 34 illustrated in FIG. 3 also includes an AND gate 70 having three inputs and an output. The output of AND gate 70 is supplied to an RS flip-flop 60, the Q output $S_{AK}$ of which is supplied as an input to downstream characteristic generator 62.

If the output signal $S_{OD}$ from the OR gate 46, the comparator signal $S_{KTh}$ and the output signal $S_{DC}$ from the device 68 are at a high level, then a fault is present in the triggering system, because either the impedance differential $\Delta Z$ was present long enough or it is greater than a limiting value $Z_G$, or because no current $i_{Th}$ flows through the current-converter valve 10, and the capacitor voltage $u_C$ exhibits a direct-voltage component, as a result of a defect in the current-converter valve 10 (failure of a firing device). As a result, the output signal $S_{AN}$ from the AND gate 70 changes from a low level to a high level, through which means a firing-angle signal $S_{\alpha S}$ is generated by means of the output signal $S_{AK}$ from the RS flip-flop 60 and by means of the conduction current $i_L$. This firing-angle signal $S_{\alpha S}$ results in a protective firing.

By means of the method and apparatus according to the present invention, defects in the triggering system of the controlled series capacitor are recognized. As explained above, these defects result in:
asymmetry;
unsteadiness of the dynamic characteristic; hunting in the closed-loop control;
overloading of valve components.

Often, unfavorable instances of conducted interference are manifested on the network. Therefore, the necessity arises to intervene in accordance with the method and apparatus of the present invention. The possibilities are:
Blocking the firing in the defective branch; an impedance asymmetry is accepted thereby;
Firing-pulse blocking in all branches;
Activating a limiting characteristic in all branches; a TCR operation having a limited control range can then be carried out.

What is claimed is:

1. A method for recognizing defects in a triggering system of a controlled series compensator, the method comprising steps of:
   a) calculating a currently effective impedance of the controlled series compensator in response to a measured capacitor voltage and a measured conduction current;
   b) determining an impedance differential in dependence upon a setpoint impedance selected from the operating mode of the controlled series compensator, whereby the impedance differential value is observed for an appropriate time span and/or is compared to an impedance limiting value;
   c) generating a first firing-pulse blocking signal, as soon as the impedance differential has existed for an appropriate time span and/or is greater than the specifiable impedance limiting value, and the measured conduction current is less than a specifiable limiting value;
   d) generating a firing-angle signal as soon as the impedance differential has existed for an appropriate time span and/or is greater than the specifiable impedance limiting value, and the measured conduction current is greater than a specifiable limiting value, whereby the value of the firing-angle signal is dependent upon the conduction current to such an extent that a protective firing of a current-converter valve of the controlled series compensator can take place; and
   e) generating a second firing-pulse blocking signal as soon as the impedance differential has existed for an appropriate time span and/or is greater than the specifiable impedance limiting value, and a protective-firing signal is not generated, and the firing-angle signal has existed for an appropriate time span.

2. The method according to claim 1, wherein the firing-angle signal is generated as soon as the measured capacitor voltage exhibits a direct voltage component, and a value of a measured valve current of the controlled series compensator is less than or equal to a lower limiting value, whereby the value of the firing-angle signal is dependent upon the conduction current to such an extent that a protective firing of the current-converter valve of the controlled series compensator can take place.

3. An apparatus for recognizing defects in a triggering system of a controlled series compensator, the apparatus comprising:
   a processor calculating a currently effective impedance of the controlled series compensator in response to a measured capacitor voltage and a measured conduction current;
   a comparator determining an impedance differential in dependence upon a setpoint impedance selected from the operating mode of the controlled series compensator, whereby the impedance differential value is observed for an appropriate time span and/or is compared to an impedance limiting value;

means for generating a first firing-pulse blocking signal as soon as the impedance differential has existed for an appropriate time span and/or is greater than the specifiable impedance limiting value, and the measured conduction current is less than a specifiable limiting value;

means for generating a firing-angle signal as soon as the impedance differential has existed for an appropriate time span and/or is greater than the specifiable impedance limiting value, and the measured conduction current is greater than a specifiable limiting value, whereby the value of the firing-angle signal is dependent upon the conduction current to such an extent that a protective firing of a current-converter valve of the controlled series compensator can take place; and means for generating a second firing-pulse blocking signal as soon as the impedance differential has existed for an appropriate time span and/or is greater than the specifiable impedance limiting value, and a protective-firing signal is not generated, and the firing-angle signal has existed for an appropriate time span.

4. An apparatus for recognizing defects in a triggering system according to claim 3, said controlled series compensator including a firing-circuit subassembly, a valve-base electronic circuit, a series capacitor integrated in a transmission line, an arrester electrically connected in parallel with the series capacitor, a series connection of a controllable reactor and a current-converter valve which is connected in parallel with the series capacitor, a series connection of a by-pass switch and a damping circuit, and a potential divider, wherein said apparatus is electroconductively connected to the valve-base electronic circuit, to a device for detecting the conduction current, and to an output of the potential divider, and said apparatus is supplied with a specifiable impedance limiting value, a conduction-current limiting value, and a mode signal, and that the outputs where a firing-angle signal and a first and a second firing-blocking signal are applied are electroconductively connected to the firing-circuit subassembly.

5. An apparatus according to claim 3, wherein said apparatus comprises a microprocessor.

6. An apparatus according to claim 4, wherein said apparatus comprises a microprocessor.

7. An apparatus according to claim 3, said apparatus comprising on an input side a signal-conditioning device connected on an output side to a signal-processing device whose outputs are outputs of said apparatus.

8. An apparatus according to claim 7, wherein on the input side, the signal-conditioning device comprises a computing circuit for calculating the effective impedance from the measured capacitor voltage and the measured conduction current, and a changeover switch, at whose inputs the setpoint impedances are applied, and at whose control input the mode signal is applied, and a second comparator, wherein the outputs of the changeover switch and of said processing unit are linked via a first comparator to an observation stage and to a second comparator, whereby the outputs of this observation stage and of the second comparator are connected to an OR-gate.

9. An apparatus according to claim 8, wherein the signal-conditioning device further comprises a device for determining a direct-voltage component of the capacitor voltage.

10. An apparatus according to claim 7, wherein on the input side, the signal-processing device comprises a first and a second AND gate, and a NOR gate, whereby a first input signal is fed to a first input of said first and second AND gate and via a first inverter to a first input of said NOR gate, and a second input signal is fed to a second input of said first AND gate and via a second inverter to a second input of the second AND gate, and on the output side, said signal-processing device comprises a function generator and a third AND gate, whereby a first input of the function generator is linked via an observation stage to a first input of the third AND gate and linked to an output of an RS flip-flop and wherein at a second input of said function generator a measured conduction current is applied, wherein a set input of said RS flip-flop is connected to an output of the first AND gate and at whose reset input a manual signal is applied, and whereby a second input of the third AND gate is linked to the output of the NOR gate, at whose second input a protective-firing signal is applied.

11. An apparatus according to claim 7, wherein on the input side, the signal-processing device comprises an AND gate having three inputs to which are applied three input signals and wherein on the output side, the signal-processing device comprises a function generator having one input connected to an output of an RS flip-flop, whose set input is connected to the output of the AND gate, and at whose reset input a manual signal is applied, whereby the measured conduction current is applied to the second input of the function generator.

* * * * *